US007929703B2

(12) United States Patent
Bellows et al.

(10) Patent No.: US 7,929,703 B2
(45) Date of Patent: Apr. 19, 2011

(54) METHODS AND SYSTEM FOR MANAGING SECURITY KEYS WITHIN A WIRELESS NETWORK

(75) Inventors: Douglas H. Bellows, Evanston, IL (US); Alexandro Salvarani, Edison, NJ (US); Eric Henry Grosse, Berkeley Heights, NJ (US); Mark H. Kraml, Flanders, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1256 days.

(21) Appl. No.: 11/318,481

(22) Filed: Dec. 28, 2005

(65) Prior Publication Data
US 2007/0147619 A1 Jun. 28, 2007

(51) Int. Cl.
*H04L 9/00* (2006.01)
(52) U.S. Cl. ........ 380/277; 380/282; 380/270; 713/150; 713/168
(58) Field of Classification Search .................... 380/277
See application file for complete search history.

(56) References Cited

U.S. PATENT DOCUMENTS 5,473,692 A * 12/1995 Davis .............................. 705/59
2002/0023217 A1 * 2/2002 Wheeler et al. ............... 713/171
2002/0032665 A1 * 3/2002 Creighton et al. ............... 705/76
2005/0010757 A1 * 1/2005 Bosler ........................... 713/156
2005/0044197 A1 * 2/2005 Lai ................................ 709/223
2006/0021054 A1 * 1/2006 Costa et al. ..................... 726/25

FOREIGN PATENT DOCUMENTS

GB          2 360 668        9/2001
WO      WO 03014999 A1 *   2/2003

OTHER PUBLICATIONS

Partial International Search Report dated Nov. 7, 2007.

* cited by examiner

*Primary Examiner* — Kimyen Vu
*Assistant Examiner* — Yogesh Paliwal
(74) *Attorney, Agent, or Firm* — Harness, Dickey & Pierce, P.L.C.

(57) ABSTRACT

A system for managing security keys in a wireless network includes a manufacturer certification authority (MCA) for providing a signed digital MCA certificate for installation into a new network element (NE) at the manufacturer's facility prior to the new NE being installed and initialized in the network. The MCA also provides a source of trusted authority for authenticating legacy NEs in the network. The system includes a service provider certification authority for managing certificates and files used by the NEs to communicate securely within the network, a signing server for providing signing services to NEs for authentication, an element manager for providing security key and digital certificate management, and a management agent (MA) for providing proxy functionality of the EM security key services to NEs not directly connected to the EM.

19 Claims, 4 Drawing Sheets

METHODS AND SYSTEM FOR MANAGING SECURITY KEYS WITHIN A WIRELESS NETWORK

BACKGROUND OF THE INVENTION

1. Field of the Invention

The present invention relates generally to a system and methods for managing security keys in a wireless network.

2. Description of the Related Art

The advent of wireless high speed packet data has caused the Radio Access Network (RAN) in wireless networks to evolve from a circuit-switched to a packet-switched network, in an effort to meet the high capacity demand efficiently and to interface and operate with other packet data networks. As a consequence, the RAN network elements (NEs), such as computers and/or servers in Radio Network Controllers (RNCs) and/or base transceiver station (BTSs), and interfaces between these NEs have been exposed to the IP traffic. This may introduce security threats and vulnerabilities to the NEs that needed to be resolved.

One line of defense adopted to protect the RAN NEs from these security threats and vulnerabilities has been to replace existing non-secure communication protocols used by the RAN with secure protocol versions, such as Secure Shell (SSH) and IP security (known as "IPsec"). SSH is a program to log into another computer over a network, to execute commands in a remote machine, and to move files from one machine to another. SSH provides strong authentication and secure communications over unsecure channels. IPsec is a set of protocols developed by the Internet Engineering Task Force (IETF) to support secure exchange of packets at the IP layer.

These protocols require public/private key pairs, digital certificates and other credentials to be populated in each network element in the network, in order to support strong authentication and public key cryptography. These credentials must be generated, provisioned to the network elements and in general managed in a way that is secure and based on trusted sources, such as via a manual out-of-band procedure or by employing some type of an automated process via exchange of digital signatures.

In a wireless access network, the network elements that host the security credentials (i.e., key pairs and digital certificates) are the computers and servers in the Radio Network Controller (RNC) and/or the base transceiver station (BTS). In order to manage these credentials in a large network, with several thousand BTSs, the procedures should be automated so that the operation becomes manageable. The alternative is to manage these processes manually, which would substantially increase maintenance cost, lower operational efficiency and which likely would be more prone to human errors and/or security breaches. The scalability problem posed by providing security key management in networks having a substantial number of BTSs (hundreds, thousands, etc.) should be addressed.

SUMMARY OF THE INVENTION

An exemplary embodiment of the present invention is directed to a system for managing security keys and digital certificates in a wireless network in support of network security. The system includes a manufacturer certification authority (MCA) for providing a signed digital MCA certificate for installation into a new network element (NE) at the manufacturer's facility prior to the new NE being installed and initialized in the network. The signed digital MCA certificate is used for authentication of the new NE's security key pair to enable secure communications with other NEs in the network. The MCA also provides a source of trusted authority for authenticating legacy NEs in the network which does not include the digital MCA certificate installed therein. The system includes a service provider certification authority (SPCA) for managing digital SPCA certificates and files used by the new and legacy NEs to communicate securely within the network, a signing server (SS) for providing signing services to the new NEs and legacy NEs for authenticating the new and legacy NEs to the network, an element manager (EM) for providing security key and digital certificate management, provisioning and initialization services of any new NEs or legacy NEs that are directly or indirectly managed by the element manager, and a management agent (MA) for providing proxy functionality of the EM security key services to the NEs that are not directly connected the EM.

Another exemplary embodiment of the present invention is directed to a method for managing security keys of a network element to be installed in a service provider network. The method includes receiving, at a manufacturer certification authority (MCA) that is offline from the service provider network, a public key of a network element (NE) at a factory of the manufacturer that has yet to be installed and initialized in the network. A digital certificate signed by the MCA of the NE's public key is sent back to the NE. The certificate indicates that the NE's public key is genuine and from a trusted source. The NE's public key, upon installation and initialization in the network, is authenticated to key security management entities in the network based on the digital MCA certificate.

Another exemplary embodiment of the present invention is directed to a method for managing security keys a legacy network element in a service provider network. The method includes receiving a public key from the legacy network element (NE), and providing a bundle of digital certificates from a plurality of key security management entities in the network back to the legacy NE with the legacy NE's public key for indicating that the legacy NE's public key is genuine and can be trusted.

BRIEF DESCRIPTION OF THE DRAWINGS

Example embodiments of the present invention will become more fully understood from the detailed description given herein below and the accompanying drawings, wherein like elements are represented by like reference numerals, which are given by way of illustration only and thus are not limitative of the example embodiments of the present invention.

DETAILED DESCRIPTION OF THE EXAMPLE EMBODIMENTS

The following description relates to an example system and exemplary methods for managing security keys and digital certificates in a wireless network in support of network security. Example wireless networks include service provider networks based on one or more of CDMA (IS95, cdma2000 and various technology variations), 1xEV-DO, W-CDMA/UMTS, and/or related technologies, and may be described in this example context. However, the example embodiments shown and described herein are meant to be illustrative only and not limiting in any way. As such, various modifications will be apparent to those skilled in the art for application of the described methods and system for managing security keys in service provider networks based on technologies other than the above, which may be in various stages of development and intended for future replacement of, or use with, the above networks or systems.

Figure 1:
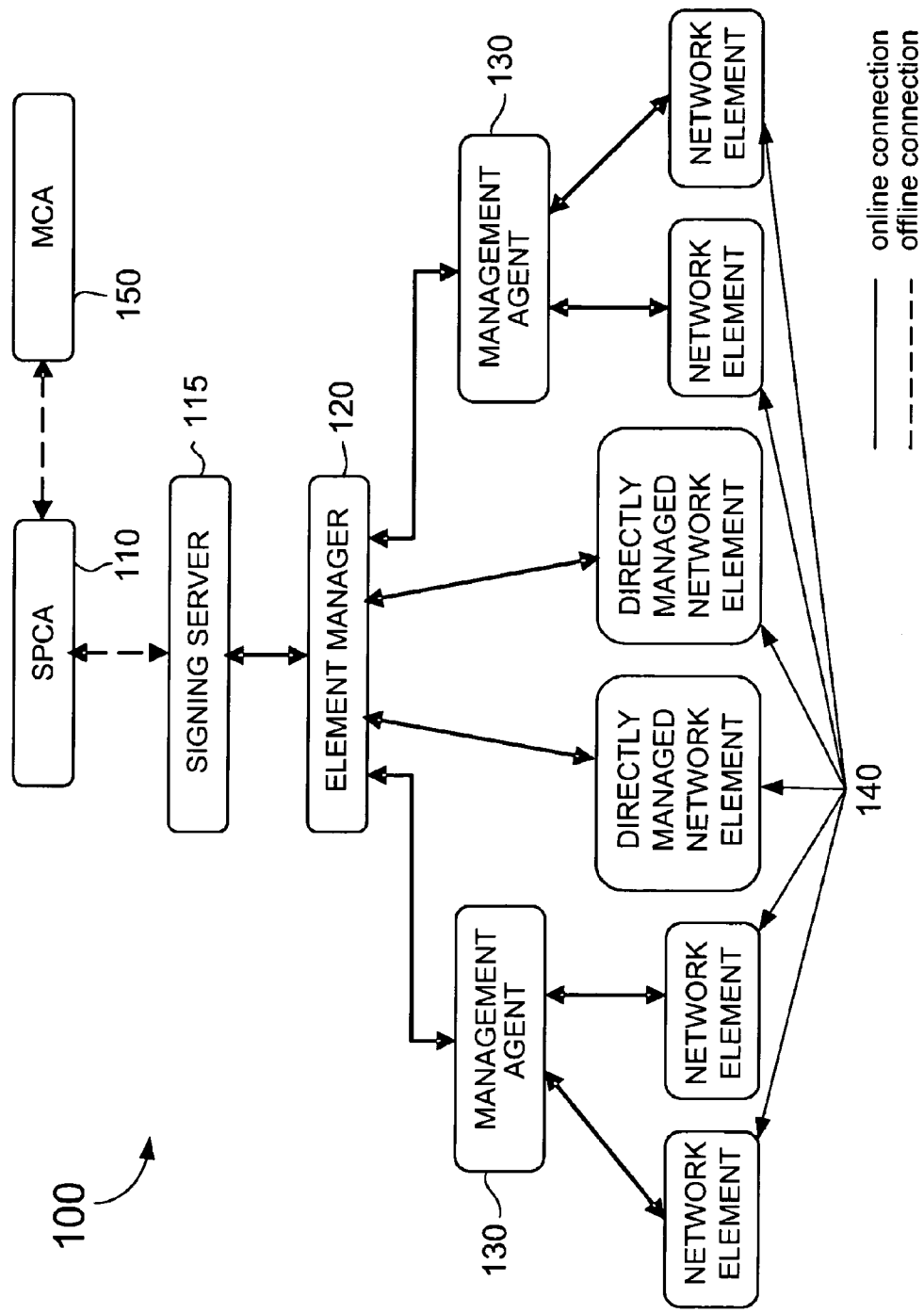
FIG. 1 is a block diagram illustrating a key security management system for managing security keys and digital certificates and other types of security credentials within a wireless network, in accordance with an example embodiment of the present invention.

FIG. 1 is a block diagram illustrating a network security key management system for managing security keys, digital certificates and other types of security credentials within a wireless network, in accordance with an example embodiment of the present invention. The effectiveness of a cryptographic mechanism depends on the effectiveness with which keys and certificates are managed. Even the most robust cryptographic algorithms and the most secure protocols require suitable key management services and functions to meet the security requirements in accordance to the threats faced by the security services.

In accordance with the example embodiments, these key management services may be managed by a larger entity referred to as a key management infrastructure, in which players and functions may be defined within a network security key management system 100. FIG. 1 shows a high level architecture of the network security key management system 100, the key security management entities and relationships between the management entities.

As will be explained in more detail below, the system 100 may include a service provider certification authority (SPCA) 110, a signing server (SS) 115, an element manager (EM) 120, one or more management agents (MAs) 130 under control of EM 120 and one or more network elements (NEs) 140. Each of these entities in a wireless network (e.g., service provider network) is configured to communicate online through secure communication levels. Additionally, system 100 includes a manufacturer certification authority (MCA) 150. The MCA 150 is a standalone, offline system, i.e., not in online communication with the network or management entities of system 100. The MCA 150 is owned by the equipment manufacturer of the NEs 140 and is located and managed and operated by the equipment manufacturer.

The SPCA 110, SS 115, EM 120 and MA 130 represent management entities providing key management services online to the NEs 140. The MCA 150 will also provide certain services offline to newly-fabricated NEs that are at a factory integration facility of the manufacturer and hence have not yet been shipped to the service provider for installation and initialization into the network. These network elements may be referred to hereafter as "new NEs". Each of the management entities as well as the network elements are described in further detail below.

New and Legacy Network Elements

A network element (NE) 140 may be defined as any computer system that includes an IP address and can communicate with other NEs within a wireless network (e.g., peer-to-peer communication). A NE 140 could be embodied as a base transceiver station (BTS), radio network controller (RNC) or a component on an RNC such as an application processor. The NE 140 can communicate using with other peers through a service provider network or node, for example. The NEs 140 described herein may be referred to as a new NE 140 or a legacy NE 140.

As used herein, a new NE is a network element newly fabricated at a factory integration facility of the manufacturer and hence has not yet been shipped to the service provider for installation and initialization into the network. As will be seen below, a new NE 140 will be provisioned with a digital certificate of the MCA 150 at the factory which indicates that the public key of the new NE 140 can be trusted, prior to shipping and installation/initialization in the network.

A legacy element as defined herein is an NE within a given wireless network that does not include the MCA digital certificate from the manufacturer. These legacy NEs 140 thus do not have the digital certificate from the MCA 150 to be used for authentication.

Accordingly, the NE 140 is the node in the service provider network that requires the private/public key pair to authenticate itself in order to use secure protocols to communicate with other network elements in the network. A network element that is capable of permanent storage generates the key pair by itself. Examples of network elements that generate and store their own key pair are the computer systems and application processors supporting the various Operation, Administration, Maintenance and Provisioning (OAM&P) functions in the RAN and the computer systems supporting call processing and air interface functions. Typically, all the network elements that are supported in the RAN are capable of storing their key pairs in permanent memory. However, network elements which do not have the means to store the key pairs permanently, like diskless systems, must rely on other means to generate and access their key pairs.

Manufacturer's Certification Authority (MCA)

The MCA 150 is a standalone and offline certification authority system. A primary function of the MCA 150 is to sign, manage and revoke X.509 v3 certificates of host public keys generated by the new NEs fabricated by the manufacturer that need to communicate securely with other network elements. The MCA 150 receives the host public keys, signs the certificates and sends them, through a secure channel, to the network elements before they are shipped to the service provider. The digital MCA certificate is stored in non-volatile memory in the new NE 140 at the factory integration facility before the new NE 140 is shipped to the service provider for installation and initialization in the network.

A primary purpose of the MCA certificate is to authenticate the new NE 140 to the MAs 130 and EMs 120 when the new NE 140 is first installed and initialized in the service provider network. The new NEs 140 that have the MCA certificates installed at the factory can use the digital MCA certificates to prove their identity when these NEs first boot in the network.

On the other hand, legacy NEs 140 do not have the MCA certificates installed at the factory, and therefore cannot authenticate themselves when they try to exchange security credentials with the EM 120 and MA 130 for the first time. A slightly different procedure must be used by the legacy NEs 140 to acquire the security credentials during initialization.

As an illustration, one way to initialize the security credentials of a legacy NE is for the security administrator to provision some component of the identity of the NE that can be used to accept or decline the NE public key and the other security credentials. This process may be automatic for scalability, and can be restricted to be available only under the surveillance of the security administrator at a predefined time internal. Once the security channel is established between the legacy NE 140 and the EM 120, the procedure can proceed in a similar manner to the new NEs, and the MCA digital certificate and the other credentials can be loaded in the legacy NE 140. This mechanism provides a "bootstrapping" of network information into the legacy NE 140 where the legacy NE 140 does not have the MCA certificates installed at the factory.

The MCA 150 is designed for high availability, with a backup system for redundancy. The MCA 150 is configured to handle a large number of NEs. The MCA uses a single root key pair to sign the certificates used by the NEs in the service provider network. The MCA 150 complies with the ITU-T Recommendation X.509 v3 standard for interoperability and chain delegation. It also supports Certification Revocation List (CRL).

Service Provider Certification Authority (SPCA)

The SPCA 110 is the certification authority that provides certificates and files needed for daily operation and secure communication between the network elements in the service provider network. The SPCA 110 provides services to new network elements 140, as well as the legacy network elements 140 that already exist.

The SPCA 110 is supplied, owned, operated and maintained by the service provider, and is the root certification authority in the entire service provider network. The SPCA 110 is configured to issue, manage and revoke digital certificates that are needed by the NEs 140 to communicate securely. The SPCA 110 uses a single root key pair to sign the certificates that are distributed to the NEs 140.

The SPCA certificates are used to authenticate information sent from the EMs 120 and MAs 130 to the NEs 140 installed in the network in an analogous manner that the MCA certificates are used for the new NEs 140, plus all the public key infrastructure steps that require SPCA certificates in the service provider network, like legacy system support of NEs 140 that do not have MCA certificates, and daily communication between NEs 140.

The SPCA 110 complies with the ITU-T Recommendation X.509 v3 standards for interoperability with the NEs.140 in the service provider network, and issues CRLs and supports CRL management.

Signing Server

The signing server (SS 115) is the entity that is responsible for signing, in real time or near real time, the host and user public keys of the EMs 120, MAs 130 and NEs 140 in the service provider network. The SS 115 is a delegate certification authority in the network. Its purpose is to provide low latency signing services to the NEs 140, and to physically isolate the SPCA 110 to minimize security vulnerabilities of the SPCA 110. Since the SS 115 is online, it is easier to revoke certificates.

At initialization, the SS 115 generates a key pair to sign certificates. The SS 115 may support two distinct configurations: a real time software application physically collocated in the same hardware as the EM 120 for smaller carriers, or a separate physical system deployed one per Mobile Switching Center (MSC), one per network, or one per region for big carriers. The physical system may be online or offline. Since the SS 115 responds to signing requests every time a NE 140 is provisioned in the network, the service provider decides which SS 115 configuration to adopt, depending on their own latency requirements and security policies. The service provider will supply the SS 115 when the choice of signing server configuration is the one with a physically separated system.

Element Manager

The element manager (EM 120) is the entity in the upper tier of system 100 between the signing server 115 and the network elements 140. The EM 120 may be responsible for the following exemplary functions: (a) key and certificate management, provisioning and initialization of the network elements 140 that are directly managed by the element manager 120; (b) key and certificate management, provisioning and initialization of all the management agents 130 under the element manager 120's domain; (c) to provide a human interface for manual provisioning and configuration of the security capabilities of the key management system 100; (d) to maintain a state machine of the state of the network elements 140 used during initialization operations and daily operations; (e) to provide an interface to the signing server 115 to submit requests to sign host and user public keys from any of the management agents 130 or any of the network elements 140 under the element manager 120's domain; (f) to provide a mechanism to process requests and download certification revocation lists (CRL) files into the network elements; and to perform security audit trail services (e.g. login of provisioning and signing request activities).

The element manager functionality can be supported in existing hardware in the RAN, making use of existing software platform and application resources and protocols as much as possible. Since the EM 120 provides local services, the element manager functionality can be distributed over many physical devices in the network.

Management Agent

In contrast to the EM 120 which acts in a managing role, the management agent (MA 130) acts in a managed role. The MA 130 extends the EM 120 local security management services to other NEs 140 as an intermediate element manager, or proxy, providing interface concentration between the EM 120 and the NEs 140. The NEs managed by the MA 130 can be located in a cluster of local network elements, like in the case of a RNC, or remotely as is the case of BTSs. The interfaces of the MA 130 to the EM 120 and the NEs 140 allows the MA 130 to provide continuous real time security management services, like provisioning and initialization of the NEs 140, distribution of certificates and files needed by the client and server devices to run SSH and IPsec, for example.

Since the MA 130 is local to the NE 140, there are many MAs 130 in the service provider network. In most cases, the MAs 130 are also network elements in their own right, so they should be provisioned and initialized as both. In any case, the MAs 130 should be initialized before the key management services in the NEs 140 they serve are initialized. The management agent application resides in existing hardware in the service provider network.

Key Management for New NEs

When a board is fabricated at the factory or manufacturing facility, a NE is placed on the board and is installed with a pack such as a microprocessor with software, for example. In general, when the pack is installed on a NE, the pack is booted-up and the installed software runs to generate a key pair for authentication. A public key is generated which may be extracted and shipped to a certification authority such as the SPCA and a private key is generated which may be stored in the NE.

In accordance with the example embodiment, the following describes what happens to a new NE, from point of fabrication at the manufacturer's factory to installation and initialization within a wireless network such as a service provide network. Initially, once the new NE 140 has been manufactured, it is installed with software and the system is booted to check the software configuration in a diagnostic test. At the end of the diagnostic, two keys are generated: the public key to be shared among peers for use in authentication, and a private key which is not shared. The new NE 140 maintains the private key protected, but the new NE 140 must be able to broadcast the public key and needs to make its public key trustable to other peers who may want to communicate or authenticate the new NE 140 once it is installed in a wireless network such as a service provider network.

The public key generated in the diagnostic may be sent to the manufacturer certification authority (MCA) 150. This public key may be transmitted online through secure dedicated channels, such as out-of-band secured channels. Once the MCA 150 receives the public key, the MCA 150 generates a digital certificate which is signed by the MCA 150. The certificate represents that this public key is for this particular new NE140, and it is trustable. This is a digital certificate, e.g., a file with information that is hashed and encrypted.

Of note, the MCA 150 may itself be a network element and includes software to generate a root key pair: the private key of the MCA 150 and the root public key of the MCA150, which are passed to the other security key management entities within the wireless network that perform network security key management, such as the SPCA 110, the SS 115, the EM 120 and/or MAs 130 under the control of the EM 120. In system 100, each of the SPCA 110, SS 115 and EM 120/MA 130 are provided with the MCA's root public key upon being provisioned in the network.

The MCA digital certificate for the new NE 140's public key has certain information of the new NE 140, such as the date of when the public key of the new NE was generated, the life of the digital certificate, what entity issued the digital certificate and the hash of the public key, for example. The digital certificates cannot be forged, but may be passed and copied.

Accordingly, and so as to ensure that the MCA digital certificate is trusted and not forged, an inquiring entity can test by using the root public key of the MCA 150 to test that the digital certificate is, in fact, genuine. There is existing software which may perform this evolution. The MCA digital certificate is then sent back to a diagnostic center at the manufacturing site and installed onto the board of the new NE 140.

Accordingly, the new NE 140 at the manufacturing factory now includes the digital MCA certificate indicating that its public key can be trusted as that of the new NE 140. The certificate is signed by the MCA 150. In addition, the NE downloads, such as in persistent memory, a digital certificate of the MCA 150's root public key, self-signed by the MCA 150. This certificate may be is used by the new NE 140 to authenticate the EM digital certificates of EM 120 during initialization, for example. Of note, the security key management entities (SPCA 110, SS 115 and EM 120/MA 130) of the network security key management system also have the root public key of the MCA 150, as discussed above. This enables these management entities to verify that the MCA 150 is, in fact, genuine and a trusted source. The new NE 140 with its public key, private key, the signed digital certificate of the MCA 150 and the MCA 150's self-signed certificate is then shipped for installation into the service provider network for provisioning and initialization.

In order for the new NE 140 to communicate with another NE as part of daily operations within a given network, the new NE 140 will use the SPCA 110's self-signed certificate of its root public key to authenticate itself to the other node. The SPCA certificate will chain up to the MCA root certificate following a standard delegation chain of certificates procedure, for example.

Therefore, by providing newly manufactured NEs with MCA digital certificates, the new NEs 140, when installed in a wireless network, will be authenticated as genuine NEs of the manufacturer the first time. Other nodes in the network that need to communicate with the new NE 140 may thus authenticate and verify the identity of the new NE 140, since the MCA digital certificates loaded in the new NE140 (which have already been passed to the network authenticating entities (SPCA 110, SS 115, EM 120, MA 130), will enable these entities to authenticate the new NE 140.

Conversely, the new NE 140 has to authenticate the element manager 120 or management agent 130 so as to gain access. The new NE 140 comes equipped with the certificate of the MCA's root public key (received at time of provisioning in the equipment manufacturer facilities). Through a mutual authentication procedure, which is a standard procedure known in the art, the new NE 140 will perform reverse challenge and certification subroutines so that communication between the new NE 140 and an element manager 120 or management agent 130, or peer-to-peer communication with another NE within the network, may commence.

Key Management for Legacy NEs

There may be a situation where there are NEs within a given wireless network or at the factory awaiting installation) that do not include the preexisting MCA digital certificate from the manufacturer. These are known as legacy NEs 140, which do not have a digital certificate from the MCA of the legacy 140's NE host public key. These legacy NEs 140 must rely on a slightly different procedure to authenticate them for the first time when security credentials must be exchanged with the EM 120 and MA 130 network elements. Accordingly, the network security key management system 100 of FIG. 1 may provide a mechanism in which legacy NEs may be authenticated and communicate with other entities within the network.

In general, the procedure of exchanging security credentials (e.g. exchanging MCA certificates for the NE public key) during the initialization phase of the NE may be referred to as a "bootstrapping procedure". This "bootstrapping procedure" applies to new NEs 140 equipped from the factory with MCA certificates, as well as to legacy NEs 140 that do not have these trusted credentials before initialization.

For the legacy NEs 140, the initial mutual authentication is not possible because credentials across the nodes have not been populated yet. In this case, the entire authentication procedure must be executed under the surveillance of the security administrator of the network. Since in general, the time in which an NE bootstraps is known to the system 100 and security administrators of the network, the system 100 can provide the security administrator with the ability to open a "gate" for a fixed amount of time in which interval the legacy NE 140 can connect with the EM 120 or MA 130 and authenticate itself using other components of the legacy NE 140's identity, such as its IP address, serial number, location in the network or other provisioning information that is available).

No strong authentication is required to set the communication path. The connection may be established via a secure protocol, like SSH, which does not require client or server public key authentication. Once the connection is up, the exchange of certificates can take place, as in the case of the new NE 140 being provisioned with MCA certificates from the factory. Once the exchange is completed, the gate is closed under the supervision of the security administrator, and only strong authentication using cryptographic means are allowed to manage and exchange keys and certificates.

The rest of the procedure is similar to the one used by the factory equipped NE. A possible interaction between the legacy NE 140 and the EM 120 during bootstrap may be illustrated by the following. Once the legacy NE 140 establishes a secure connection with the EM 120 without strong authentication), the EM 120 receives the public key from the legacy NE, the EM 120 will go to the signing server (SS) 115 to commence the bootstrapping of network information that will be sent to the legacy NE 140. The EM 120 asks the SS 115 to generate a digital certificate for the legacy NE 140's public key. The SS 115 sends back a signed digital certificate to the EM 120 representing that this is the public key of this particular legacy NE 140, signed by a trusted source (the signing server 115). In fact, between the SS 115 and EM 120, a bundle of digital certificates are sent back to the legacy NE 140 with its public key as part of the bootstrapping procedure. This may be done online through secure dedicated channels.

In addition to sending back (1) a digital certificate for the public key of the legacy NE 140, signed by it, the SS 115 (2) sends back a digital certificate for its own public key signed by a trusted source—the SPCA 110. SS 115 also sends (3) the self-signed digital certificate of the root public key of the SPCA 110 to the EM 120. The EM 120 bundles these three certificates with the legacy NE 140's public key and an additional certificate, (4) a digital certificate of its own public key, signed by SS 115, and forwards the bundle of certificates with the legacy NE's public key either directly to the legacy NE 140 (if it is being directly managed by the EM 120) or to a proxy MA 130 under the domain of EM 120. As it was provided with the digital certificate (self-signed by the MCA 150) of the MCA 150's root public key at time of provisioning, the EM 120 may also provide this to a legacy NE 140 under its direct control. In an example, the MA 130 may also have a copy of the MCA certificate stored therein, provided at time of provisioning.

If there is a MA 130 under the EM 120's domain, and since the MA 130 has a digital certificate of its own public key signed by a most trusted source (SPCA 110), it will add this certificate (5) to the bundle. Additionally, the MA 130 may add the self-signed digital certificate of the MCA 150 to bundle, and send the certificate bundle with the legacy NE 140's public key back to the legacy NE 140. Further, the MA 130 (or EM 120 if directly managing the legacy NE 140) will provide digital certificates of public keys for those network elements in the service provide network that the legacy NE 140 needs to communicate with, each certificate signed by the SS 115.

Accordingly, as the legacy NE 140 receives this bundle of digital certificates, it then may be authenticated in the network so as to initiate communications with other NEs, e.g., peer-to-peer communications. The bundle of certificates received by the legacy NE 140 thus represents a chain delegation of certificates of trusted sources that points to the root public key of the SPCA. Upon sending a state report to the MA 130 (or EM 120), the bootstrapping procedure is complete.

As the public key of the legacy NE 140 can now be authenticated in the service provider network, the EM 120 will forward the public key of the legacy NE 140 to other NE's in the network that need to communicate securely with legacy NE 140, so as to commence peer-to-peer communication. When the secure protocol for peer-to-peer communication between NEs uses digital certificates for peer authentication, the certificates can be chained so that the root of the chain is the MCA 150's root public key, which is provided by the MCA 150's self-signed certificate. In this way, each NE 140 can challenge and authenticate the peer requiring the digital certificate chains to root to the MCA 150's public key, which is trusted information provided during the bootstrap process.

In general during bootstrap, the certificate delegate chain can point to the MCA root public key, while during daily operations, peer-to-peer certificate delegation can point to the SPCA root public key, which is also distributed during bootstrap. It is of note that the new NE 140 described in the previous example can use the secure channel used to exchange public keys and digital certificates to also receive other digital certificates in a bundle needed to authenticate other NEs, as is described next.

Peer-to-Peer Communications Between NEs

For daily operations when two NE's wish to communicate with each other (e.g., a first NE wants to communicate with a second NE), they will use the bundle of digital certificates. For example, NE 1 wants to talk to NE 2 and sends a digital certificate of its own public key, signed by the SS 115 to NE 2. NE 2 gets the public key of NE1 signed by the SS 115 and uses a different certificate in the bundle issued by the SPCA of the SS 112 public key to verify that the certificate received from NE 1 is authentic.

Accordingly, a given NE (legacy or new NE 140) only has to carry its own ID and does not have to repeatedly obtain each of the digital certificates for daily operations. In other words, the bundle of certificates represents an authentication of delegates or links between digital certificates and may be used by any NE to "bubble up" (or point) to the certificate of the most trusted management entity in the network, the root public key of the SPCA 110, for daily communications. All NEs in the network trust the root public key of the SPCA 110.

Therefore, for normal daily operations, a given NE 140 has the self-signed digital certificate of the SPCA 110, which may be loaded at provisioning time in the factory if it is a new NE 140 (if the service provider of destination is known), or bundled with other digital certificates and sent back to a legacy NE 140. The NE will also have the signed digital certificate of the signing server, signed by the SPCA 110 and the signed digital certificate of the public key of the EM 120, signed by the SS 115. Thus, in order to talk to another network element (NE 2), (NE 1 receives NE 2's digital certificate of its public key, signed by the SS 115 and gets the public key of the SS 115 from the digital certificate, which the NE 1 already had based on the digital certificate inserted during provisioning.

Figure 2:
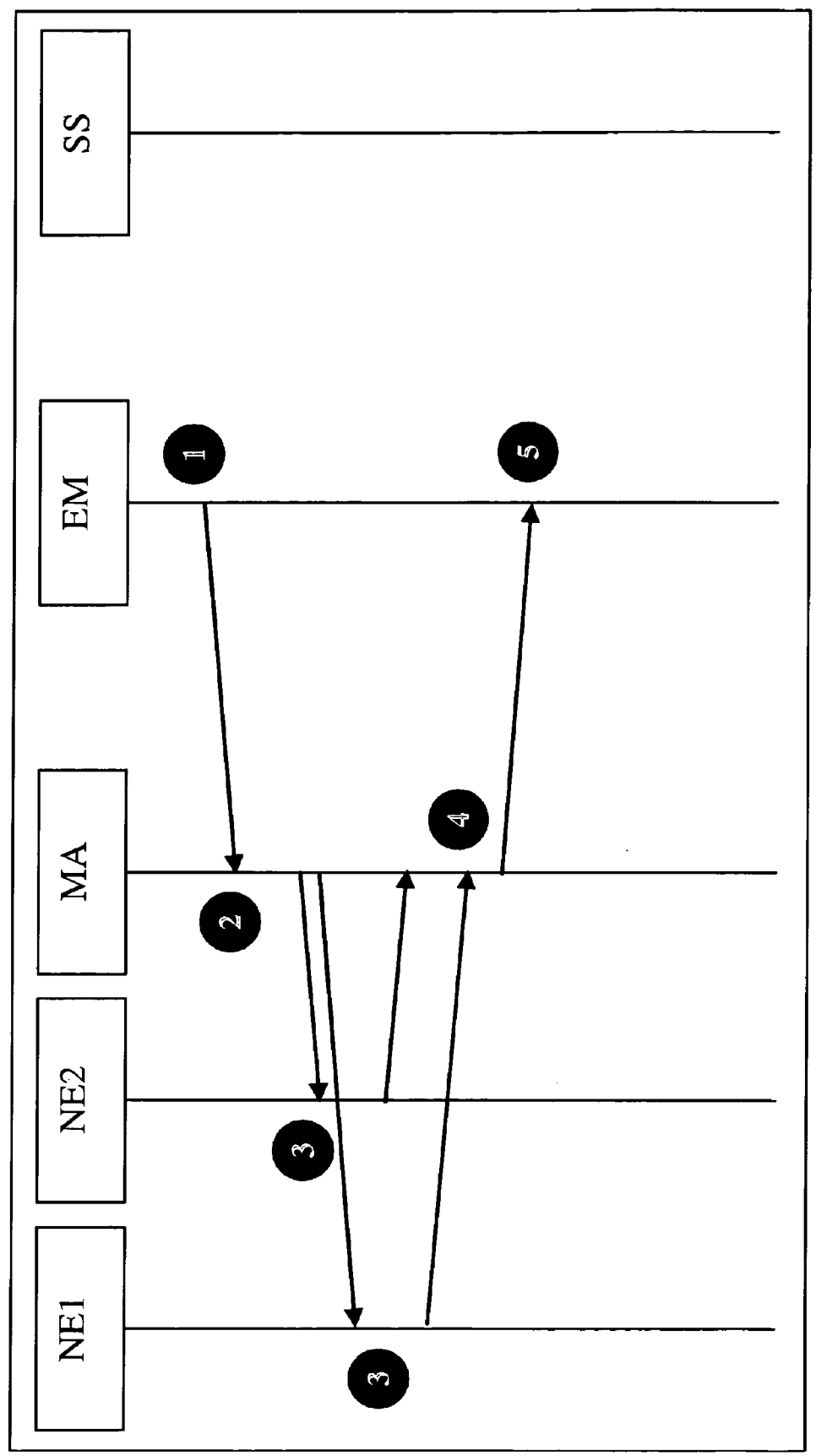
FIG. 2 is a flow diagram illustrating how the system carries out an example task related to a change of attributes associated with security functions for given network elements in the system.
Figure 3:
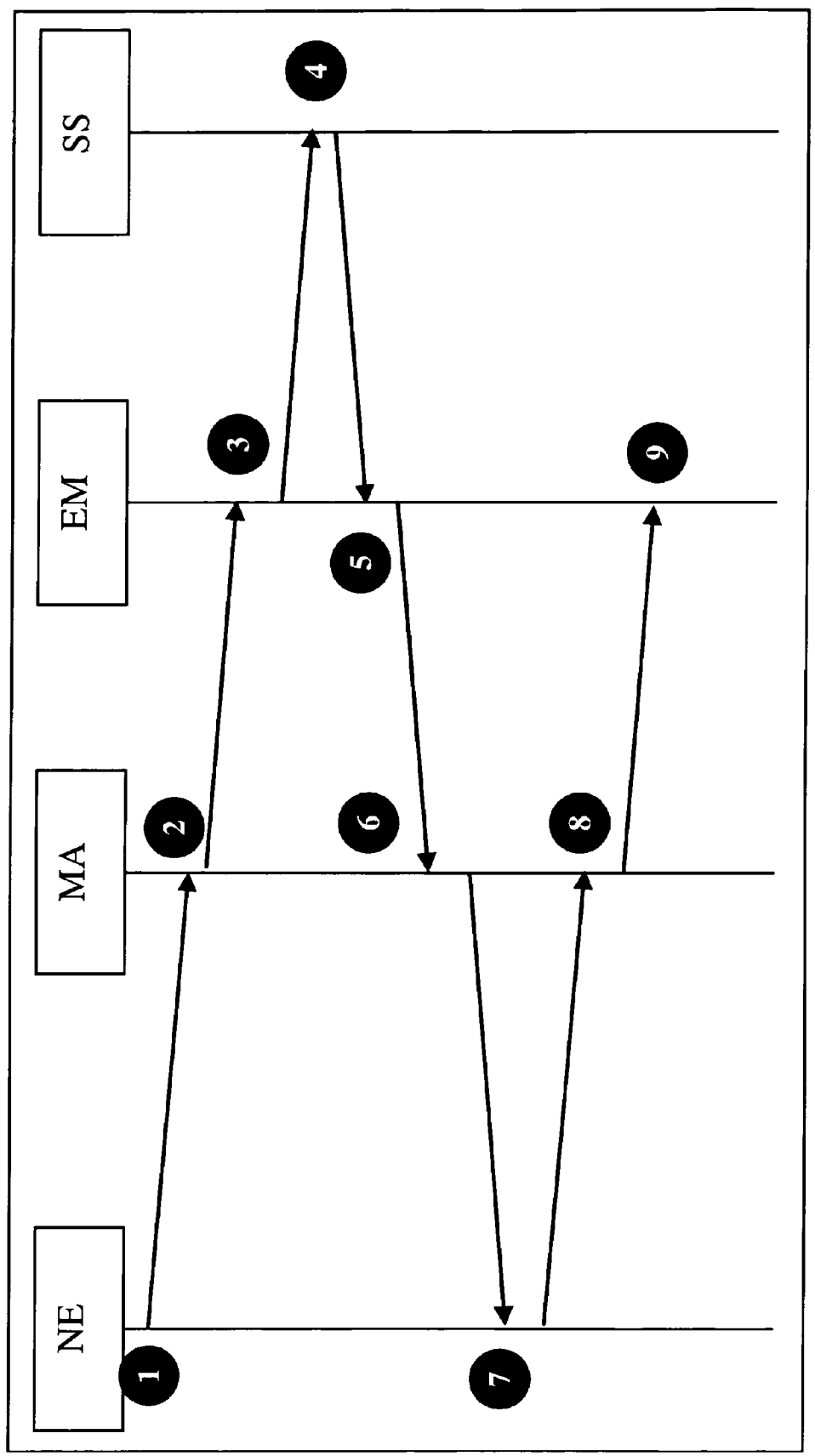
FIG. 3 is a flow diagram illustrating how the system carries out an example task related to a procedure of bootstrapping a new network element provisioned at the factory with a key pair and digital certificates into a wireless network.
Figure 4:
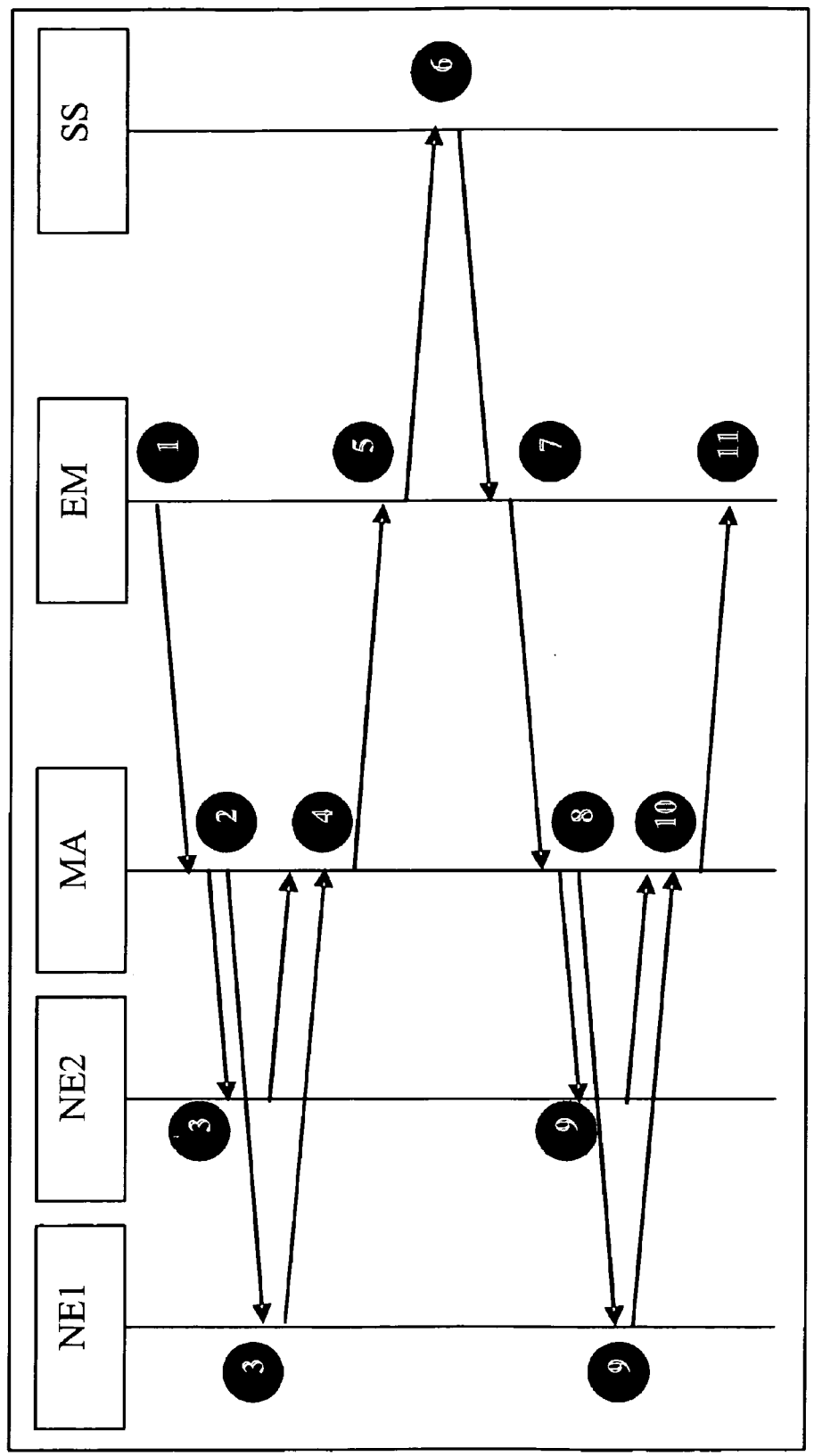
FIG. 4 is a flow diagram illustrating how the system carries out an example task related to updating certificates of two legacy network elements existing within a wireless network.

FIGS. 2-4 illustrate exemplary tasks performed by the network security key management system 100. The flow diagrams described hereafter do not show the details and steps necessary to establish secure communication between two entities. The objective of these diagrams is to illustrate how high level procedures are performed by the security management infrastructure of FIG. 1 to carry out specific tasks.

FIG. 2 is a flow diagram illustrating how the system carries out an example task related to a change of attributes associated with security functions for given network elements in the system. This is considered as part of daily operations in the network.

The service provider security administrator logs into the EM and submits a command (point 1) to change the configuration attributes of a given security capability in NE1 and NE2. There is no direct connection between the EM and the NEs, so the EM delegates the command to the MA via a secure channel that is authenticated using the digital certificates described previously. The EM sends the attributes to the MA (Point 2). The MA receives the EM command and forwards the command and the attributes to the directly connected NE1 and NE2 via a secure channel that is authenticated using the previously described certificates (Point 3).

Each NE receives and executes the command by updating the attributes. Each NE reports the state of the operation (success or failure) to the MA (Point 4). The MA forwards the state report to the EM (Point 5), which is reported to the service provider security administrator.

FIG. 3 is a flow diagram illustrating how the system carries out an example task related to a procedure of bootstrapping a new network element provisioned at the factory with a key pair and digital certificates into a wireless network.

Referring to FIG. 3, the NE boots for the first time in the service provider network. The NE is equipped at the factory with a host key pair and a certificate of the NE public key, signed by MCA 150. The NE starts a connection with the MA, which is mutually authenticated using the NE certificate and the certificate is held by the MA. Once the secure connection is authenticated, the NE sends the NE public key to the MA (arrow from Point 1) for signature by the SS. This SS certificates will be used for daily communication.

The MA receives the NE public key and forwards it to the EM (Point 2). The EM receives the NE public key and connects with the SS (Point 3) to request a certificate. The SS receives the NE public key and generates a certificate that is returned (Point 4) to the EM. The EM forwards the certificate to the MA (Point 5).

The MA receives the certificate and forwards it to the NE (arrow from point 6) with other public keys and certificates needed by the NE to communicate to other NEs in the network. The NE receives the bundle of certificates and keys, and reports (Point 7) the status of the operation to the MA (success or failure). At this point the NE has completed bootstrapping.

The MA forwards the status report to the EM (arrow from Point 8). The EM logs the status report for the security administrator at Point 9. The EM must forward the NE public key to the other network elements that need to communicate securely with this NE. These steps are not shown in the flow diagram for purposes of brevity.

FIG. 4 is a flow diagram illustrating how the system carries out an example task related to updating certificates of two legacy network elements existing within a wireless network.

Referring to FIG. 4, the service provider security administrator logs in the EM and enters a command to update the certificates used by NE1 and NE2 for strong authentication. The command is delegated to the corresponding MA (arrow from Point 1). The MA receives the command (Point 2) and forwards it to NE1 and NE2 (Point 3).

NE1 and NE2 generate a new set of RSA key pairs. Each NE sends the public key to the MA (Point 4). The MA receives the public key of NE1 and NE2 and forwards the keys to the EM (arrow from Point 5) to be signed. The EM receives the NE1 and NE2 public keys and forwards them to the signing server SS.

The SS creates the NE1 and NE2 certificates (Point 6) and forwards them to the EM. The EM receives the certificates and sends them to the MA (Point 7). The MA receives the certificates and sends them (Point 8) to NE1 and NE2. NE1 and NE2 receive the new certificates. A state report of the operation (success or failure) is created and is forward to the MA (Point 9). The MA receives the state report (Point 10) and forwards it to the EM. The EM receives the state report, which is reported to the security administrator (Point 11).

Therefore, network elements that have the MCA certificates installed at the factory (new NEs 140) can use them to prove their identity. On the other hand, the network elements that do not have the MCA certificates installed at the factory, like legacy NEs 140, must rely on alternative methods as described above to acquire the certificates needed for daily communication. Even if the bootstrapping of the legacy NEs 140 does not provide the level of security of the new NEs 140 equipped from the factory, the provisioning can be made substantially as secure as the new NEs 140 bootstrap procedure by allowing the security administrator to gate and provision the legacy NEs.

The example embodiments of the present invention being thus described, it will be obvious that the same may be varied in many ways. Such variations are not to be regarded as departure from the spirit and scope of the example embodiments of the present invention, and all such modifications as would be obvious to one skilled in the art are intended to be included within the scope of the following claims.

What is claimed is:

1. A system for managing security keys in a wireless network, comprising:
a service provider certification authority (SPCA) configured to receive a root public key of a manufacturer certification authority(MCA) and configured to manage digital SPCA certificates and files used by a new network element (NE) and legacy NEs to communicate securely within the network,
a signing server (SS) configured to provide signing services to the new NEs and legacy NEs and configured to authenticate the new and legacy NEs to the network, and
an element manager (EM) configured to provide security key and digital certificate management, provisioning and initialization of any new NEs or legacy NEs that are directly or indirectly managed by the element manager, wherein to authenticate a legacy NE which is not installed with a digital MCA certificate, the signed digital MCA certificate being used for authentication of the new NE's security key pair to enable secure communications with other NEs in the network:
the EM is configured to receive the legacy NE's public key and request at least one signed digital certificate from the SS,
the SS is configured to send the EM a digital certificate for its public key indicating that it is a trusted SS, signed by the SPCA, and a digital certificate of the SPCA's root public key, self-signed by the SPCA, and
the EM is configured to generate a digital certificate for the legacy NE's public key, signed by the EM, and bundle the SS certificate, SPCA certificate, certificate of the legacy NE's public key signed by the EM and its own digital certificate of its public key signed by the SS, each of the certificates for sending as a bundle of certificates with the legacy NE's public key to the legacy NE, the bundle of certificates representing a chain delegation of certificates of trusted sources which points to the root public key of the SPCA for authenticating the legacy NE for commencing peer-to-peer communications in the network.

2. The system of claim 1, wherein the MCA is configured to sign, manage and revoke X.509 v3 digital certificates of public keys of the manufacturer's new NEs, so that the new NEs can authenticate themselves directly to the EM, or indirectly to a management agent (MA) which has security management authority over the new NEs under the control of the EM, as the NE is first installed and initialized in the network.

3. The system of claim 1, wherein the MCA is configured to receive a public key over a secure channel from a given new NE located at a factory integration facility of the manufacturer, to sign the digital MCA certificate for the public key, and to send the signed digital MCA certificate with the new NE's public key over a secure channel back to the new NE, prior to the new NE being installed in the network.

4. The system of claim 3, wherein the signed MCA certificate is stored in non-volatile memory of the new NE.

5. The system of claim 1, wherein the MCA is a standalone, offline system not in online communication with the network.

6. The system of claim 1, wherein the EM includes the signed digital MCA certificate in the bundle of certificates sent to the legacy ME, the EM is provided with the MCA certificate at the time of provisioning in the network.

7. The system of claim 1, wherein the MCA is configured to provide the signed digital MCA certificate for installation into the new NE at a manufacturer's facility prior to the new NE being installed and initialized in a network and the MCA is configured to provide a source of trusted authority for authenticating legacy NEs in the network which do not include the digital MCA certificate installed therein.

8. The system of claim 1, further comprising a management agent (MA) configured to provide proxy functionality of the EM security key services to the NEs that are not directly connected to the EM.

9. The system of claim 8, wherein the MA includes the signed digital MCA certificate in the bundle of certificates sent to the legacy ME, and wherein the MA is provided with the MCA certificate at the time of provisioning in the network.

10. The system of claim 8, wherein the MCA is configured to sign, manage and revoke X.509 v3 digital certificates of public keys of the manufacturer's new NEs, so that the new NEs can authenticate themselves indirectly to a management agent (MA) which has security management authority over the new NEs under the control of the EM, as the NE is first installed and initialized in the network.

11. A method for managing security keys of a network element (NE) to be installed in a service provider network, comprising:
   receiving, by at least one of a plurality of key security management entities, a first digital certificate from a manufacturer certification authority (MCA),
   receiving, by at least one of the plurality of key security management entities, the first digital certificate from the NE,
   authenticating, by at least one of the plurality of key security management entities, the NE based on the first digital certificate,
   receiving, by at least one of the plurality of key security management entities, a public key of the NE,
   generating, by at least one of the plurality of key security management entities, a second digital certificate based on the NE public key, and
   sending, by at least one of the plurality of key security management entities, the second digital certificate, one or more other public keys and one or more other digital certificates to the NE, wherein
      the digital certificate is effective to authenticate the NE's public key to the key security management entities in the service provider network upon network installation and initialization of the NE, and
      the one or more other public keys and the one or more other digital certificates are used by the NE to communicate with one or more other NE's associated with the service provider network.

12. The method of claim 11, wherein the MCA has a root public key, and the plurality of key security management entities include at least one of:
   a service provider certification authority (SPCA) for managing digital SPCA certificates and files used by the NE to communicate securely within the network, the SPCA having the root public key of the MCA,
   a signing server (SS) for providing signing services to NE for authenticating the NE to the network, the SS having the root public key of the MCA, and
   an element manager (EM) for providing security key and digital certificate management, provisioning and initialization for the NE, the EM having the root public key of the MCA.

13. The method of claim 11, further comprising sending, to the new NE, a digital certificate signed by the MCA of a SPCA's root public key, if the service provider is known before the NE leaves a factory.

14. A method for managing security keys of a legacy network element (NE) in a service provider network, comprising:
   receiving, by one of a plurality of key security management entities, a public key from the NE,
   requesting, by the one of the plurality of key security management entities, one or more digital certificates based on the public key from another of the plurality of key security management entities,
   receiving, by the one of the plurality of key security management entities, a signed digital certificate, the public key and a self-signed certificate based on a root public key,
   configuring, by the one of the plurality of key security management entities, a bundle of certificates including the signed digital certificate, the public key, the self-signed certificate and one or more signed certificates based on respective public keys of one or more others of the plurality of key security management entities, and
   providing the bundle of digital certificates from the one of the plurality of key security management entities to the NE with the public key for indicating that the public key is genuine and can be trusted.

15. The method of claim 14, wherein the key security management entities include:
   a service provider certification authority (SPCA) for managing digital SPCA certificates and files used by the legacy NE to communicate securely within the network,
   a signing server (SS) for providing signing services to legacy NE for authenticating the legacy NE to the network, and
   an element manager (EM) for providing security key and digital certificate management, provisioning and initialization for the legacy NE, whether the legacy NE is directly or indirectly managed by the EM.

16. The method of claim 15, wherein
   the one or more signed certificates includes a certificate of the EM's public key signed by the SS and a certificate of the MA's public key signed by the SPCA,
   the signed digital certificate is signed by the SS, and
   the self-signed certificate is a self-signed certificate of the SPCA based on the SPCA's root public key.

17. The method of claim 16, wherein the bundle of certificates represents a chain delegation of certificates of trusted sources which points to the root public key of the SPCA for authenticating the legacy network element to commence peer-to-peer communications in the network.

18. The method of claim 16, wherein
   one of the EM and MA is provided with a digital certificate of the root public key of a manufacturer's certification authority that is a standalone, offline system not in online communication with the network and which is the manufacturer of the legacy NE, and
   providing includes one of the MA and EM adding the MCA certificate to the bundle of certificates and providing the bundle with the legacy NE's public key to the legacy NE.

19. The method of claim 15, wherein the plurality of key security management entities include a management agent (MA) for providing proxy functionality of the EM security key services to the NEs that are not directly connected the EM, wherein the legacy NE's public key is received by a management agent (MA) under control of the EM.

* * * * *